(12) United States Patent
Wilson et al.

(10) Patent No.: US 10,705,982 B2
(45) Date of Patent: Jul. 7, 2020

(54) SECURING STREAM BUFFERS

(71) Applicant: Microsoft Technology Licensing, LLC, Redmond, WA (US)

(72) Inventors: Mei L. Wilson, Redmond, WA (US); Fabin Shen, Sammamish, WA (US); Sathyanarayanan Karivaradaswamy, Sammamish, WA (US); Gerrit L. Swaneveld, Kenmore, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 0 days.

(21) Appl. No.: 16/254,367

(22) Filed: Jan. 22, 2019

(65) Prior Publication Data

US 2019/0236033 A1 Aug. 1, 2019

Related U.S. Application Data

(63) Continuation of application No. 15/362,711, filed on Nov. 28, 2016, now Pat. No. 10,223,292.

(51) Int. Cl.
*G06F 13/00* (2006.01)
*G06F 12/00* (2006.01)
*G06F 12/14* (2006.01)
*G06F 13/16* (2006.01)

(52) U.S. Cl.
CPC ...... *G06F 12/1458* (2013.01); *G06F 13/1673* (2013.01); *G06F 2212/1052* (2013.01)

(58) Field of Classification Search
CPC combination set(s) only.
See application file for complete search history.

(56) References Cited

U.S. PATENT DOCUMENTS

| 6,889,308 | B1 * | 5/2005 | Schmidt | G06F 12/10 711/203 |
| 7,882,365 | B2 * | 2/2011 | Natarajan | G06F 12/1408 380/277 |
| 9,703,727 | B2 * | 7/2017 | Chapier | G06F 12/1491 |
| 2016/0034216 | A1 * | 2/2016 | Chun | G06F 12/14 711/103 |
| 2016/0127327 | A1 * | 5/2016 | Mehta | H04L 63/0428 713/168 |

* cited by examiner

*Primary Examiner* — Sean D Rossiter
(74) *Attorney, Agent, or Firm* — Arent Fox LLP

(57) ABSTRACT

Described are examples for securing stream data received from a stream source. A secure mode can be enabled, based on a request from an application, for storing the stream data captured from the stream source in a secured buffer. The secured buffer can be allocated in a secure memory based at least in part on enabling the secure mode. A secured buffer identifier of the secured buffer can be provided to a driver of a device providing the stream source for storing the stream data captured from the stream source in the secured buffer. The secured buffer identifier of the secured buffer can also be provided to the application for accessing the stream data stored in the secured buffer.

20 Claims, 5 Drawing Sheets

SECURING STREAM BUFFERS

CROSS-REFERENCE TO RELATED APPLICATION

This Application for patent is a Continuation of U.S. patent application Ser. No. 15/362,711, titled "SECURING STREAM BUFFERS", filed on Nov. 28, 2016, the entire contents of which is incorporated by reference herein.

BACKGROUND

Many computing devices employ input devices that produce output streams for consumption by applications operating on the computing device. These input devices can include sensor devices (e.g., cameras, biometric devices, etc.) that obtain and output data in streams including one or more data frames, where a plurality of data frames can be output according to a cadence. The streams are typically stored in memory and accessed by an operating system or one or more applications for analyzing and/or outputting data captured from the streams. In one example, a computing device may include a camera to facilitate capturing video for storing as a movie, performing video conferencing with a remote computing device, etc. In addition, the camera may be used for face authenticating a user to utilize one or more applications or other functions of the computing device based on comparing an image (or stream of images) captured by the camera to one or more other stored images according to a face recognition/authentication function. Similarly, for example, the computing device may include a fingerprint sensor to facilitate capturing fingerprint images for authenticating a user to utilize one or more applications or other functions of the computing device.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, a method for securing stream data received from a stream source is provided. The method includes enabling, based on a request from an application, a secure mode for storing the stream data captured from the stream source in a secured buffer, allocating, based at least in part on enabling the secure mode, the secured buffer in a secure memory, providing a secured buffer identifier of the secured buffer to a driver of a device providing the stream source for storing the stream data captured from the stream source in the secured buffer, and providing the secured buffer identifier of the secured buffer to the application for accessing the stream data stored in the secured buffer.

In another example, a device for securing stream data received from a stream source is provided. The device includes a memory storing one or more parameters or instructions for executing a stream server, wherein the stream server interfaces with the stream source, and at least one processor coupled to the memory. The at least one processor is configured to enable, based on a request from an application, a secure mode for storing the stream data captured from the stream source in a secured buffer, allocate, based at least in part on enabling the secure mode, the secured buffer in a secure memory, provide a secured buffer identifier of the secured buffer to a driver of a device providing the stream source for storing the stream data captured from the stream source in the secured buffer, and provide the secured buffer identifier of the secured buffer to the application for accessing the stream data stored in the secured buffer.

In another example, a computer-readable medium, including code executable by one or more processors for securing stream data received from a stream source, is provided. The code includes code for enabling, based on a request from an application, a secure mode for storing the stream data captured from the stream source in a secured buffer, allocating, based at least in part on enabling the secure mode, the secured buffer in a secure memory, providing a secured buffer identifier of the secured buffer to a driver of a device providing the stream source for storing the stream data captured from the stream source in the secured buffer, and providing the secured buffer identifier of the secured buffer to the application for accessing the stream data stored in the secured buffer.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
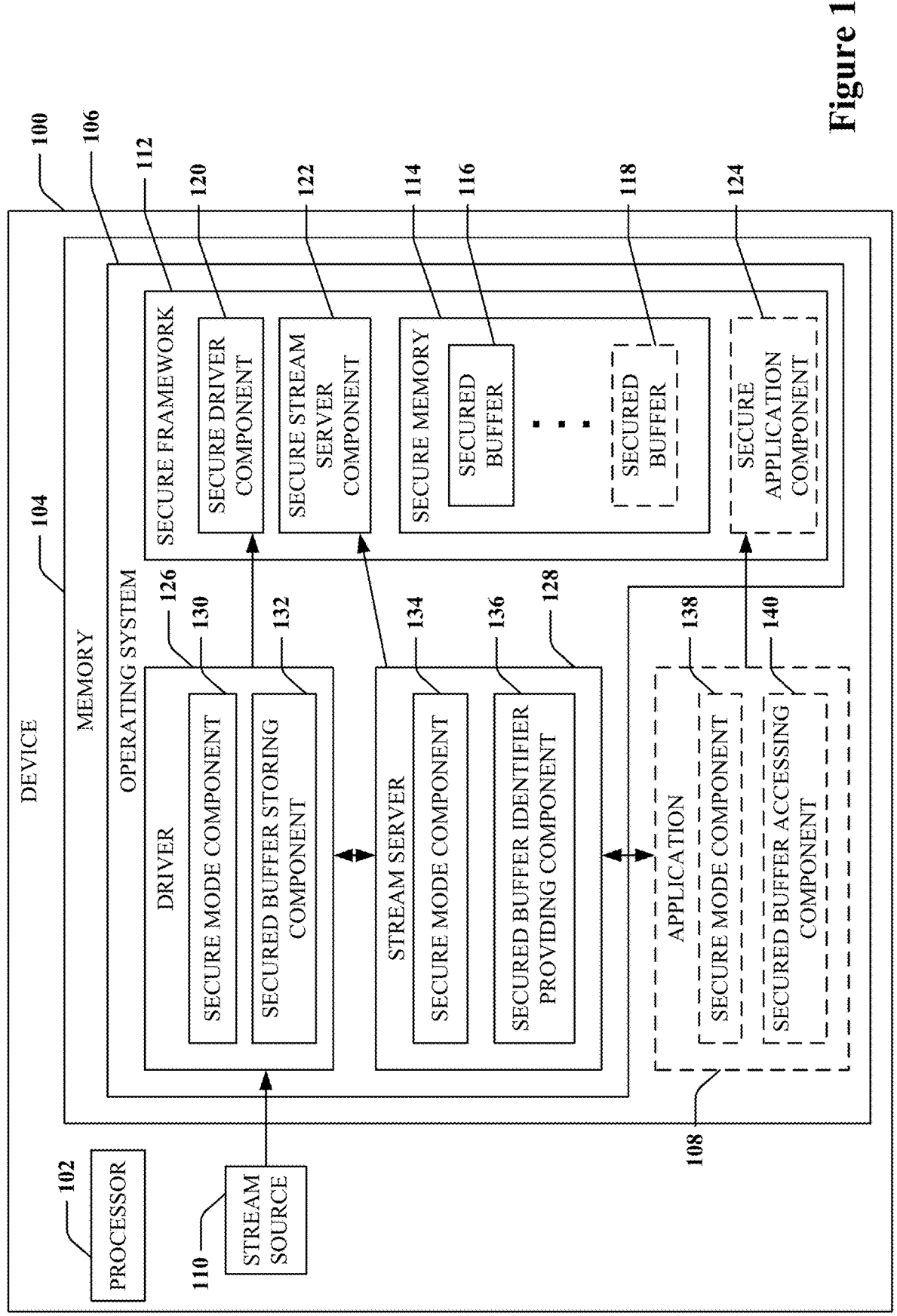
FIG. 1 is a schematic diagram of an example of a device for securing stream data from a stream source.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to securing stream buffers to facilitate storing and retrieving stream data in a secured memory. This can prevent tampering with the stream data, e.g., by a playback or middleman attack, where data in a stream may otherwise be altered in the pipeline between the device outputting the stream data and the application or operating system consuming the stream data. For example, a driver that provides the stream data (e.g., as captured from a sensor device) can be provided with a secured buffer identifier for storing the stream data in a secured buffer in secure memory. For example, the driver, operating in a kernel mode, can provide the data with the secured buffer identifier to a component operating in a secure framework for storing the data in the secured buffer. An application desiring to access the secured buffer can be provided with the same secured buffer identifier, and can communicate with a component operating in the secure framework to access the data in the secured buffer. Accordingly, applications that can access the components operating the secure framework can access the secured buffers while access by other applications can be prevented. Thus, playback or middleman attacks can be prevented by storing the stream data in secure memory that can be secured at the kernel mode and can be accessible only by components in the secure framework.

In a specific example, a stream server, which can receive data from the stream source for providing to one or more applications, can facilitate enabling a secure mode for storing stream data in a secured buffer, and managing communicating of the secured buffer identifier in the pipeline to facilitate secured storage and retrieval of the stream data from the secured buffer. For example, an application can request the stream server to enable a secure mode for storing stream data in a secured buffer. Based on this request, for example, the stream server can request allocation of a secured buffer in secure memory, and can receive one or more secured buffer identifiers corresponding to a location of the secured buffer in the secure memory. The stream server can accordingly provide the secured buffer identifiers to a driver that provides the stream source to enable the driver to request storage of stream data in the secured buffer at kernel level. The stream server can additionally provide a corresponding secured buffer identifier to the application to allow the application to access the stream data from the secured buffer (e.g., via another component operating in the secure framework).

Figure 2:
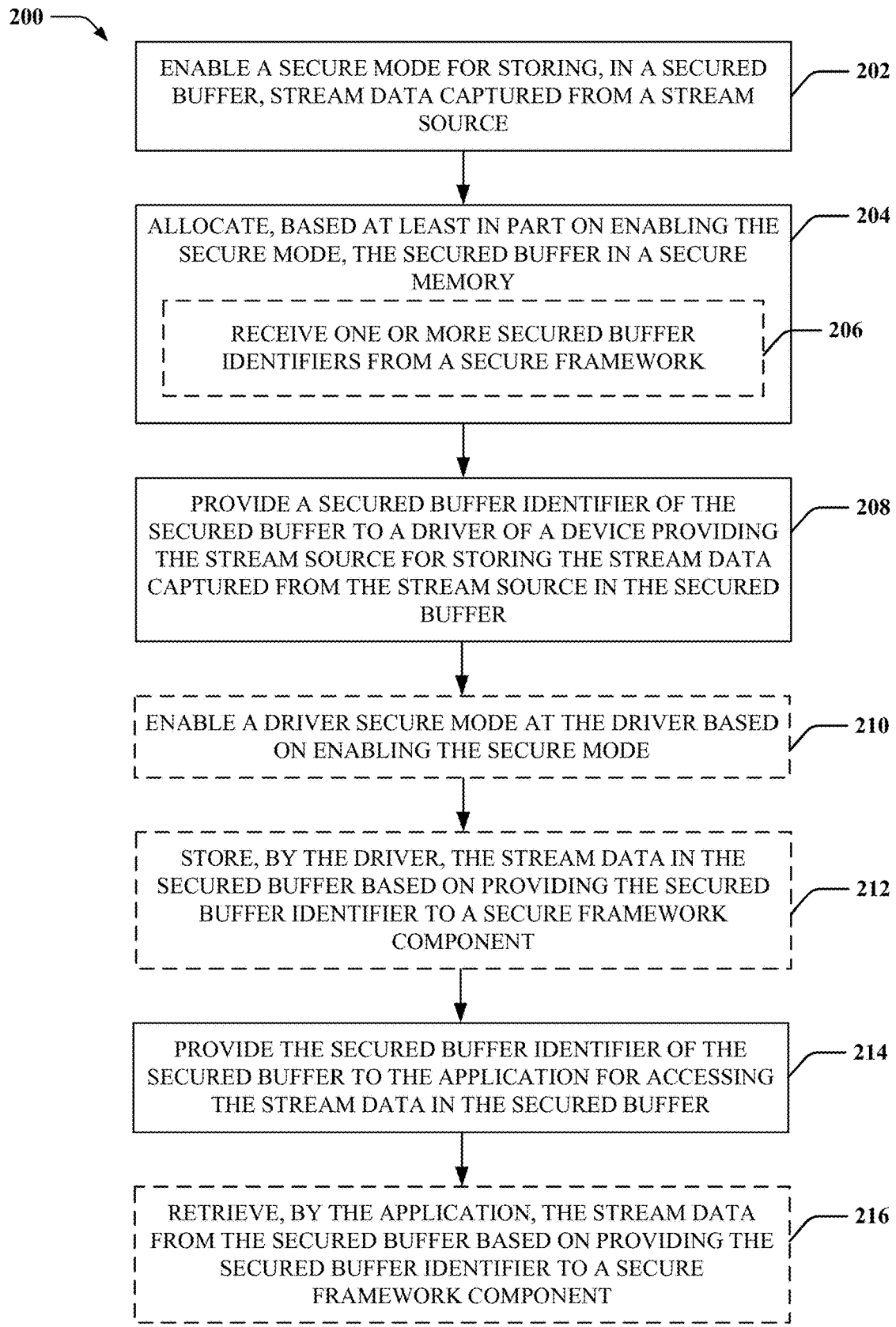
FIG. 2 is a flow diagram of an example of a method for securing stream data from a stream source.
Figure 3:
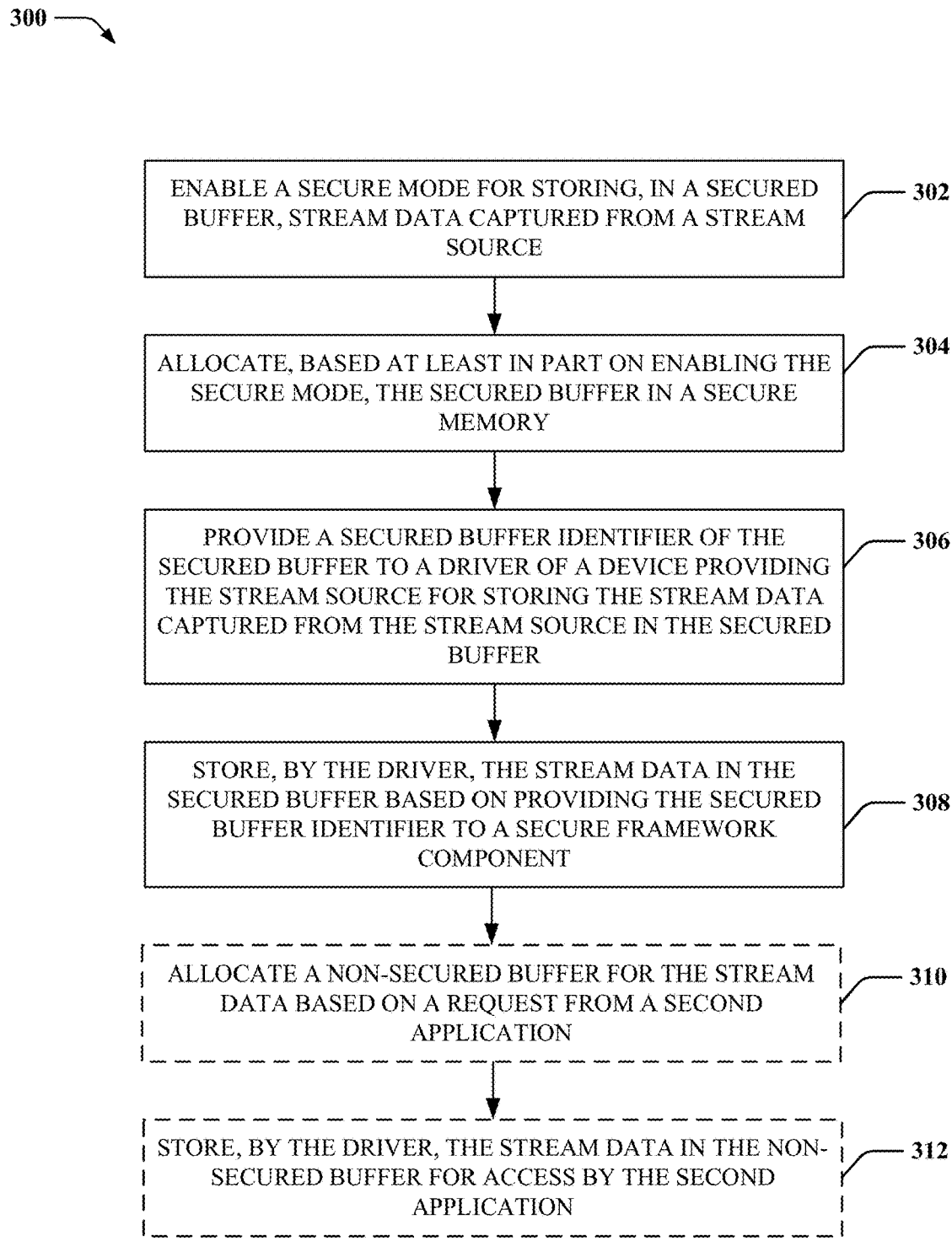
FIG. 3 is a flow diagram of an example of a method for securing stream data from a stream source and storing the stream data in a non-secure memory.

Turning now to FIGS. 1-5, examples are depicted with reference to one or more components and one or more methods that may perform the actions or operations described herein, where components and/or actions/operations in dashed line may be optional. Although the operations described below in FIGS. 2-3 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a device 100 (e.g., a computing device) that can secure stream data received from one or more stream sources. In an example, device 100 can include a processor 102 and/or memory 104 configured to execute or store instructions or other parameters related to providing an operating system 106, which can execute one or more applications, such as optional application 108. For example, processor 102 and memory 104 may be separate components communicatively coupled by a bus (e.g., on a motherboard or other portion of a computing device, on an integrated circuit, such as a system on a chip (SoC), etc.), components integrated within one another (e.g., processor 102 can include the memory 104 as an on-board component), and/or the like. Memory 104 may store instructions, parameters, data structures, etc. for use/execution by processor 102 to perform functions described herein. Device 100 can also include one or more stream sources 110 for obtaining input (e.g., video input, audio input, biometric input or other input that can be obtained in frames of data, etc.) and outputting a corresponding data stream. For example, the one or more stream sources 110 may include one or more sensor devices (e.g., a RGB camera, IR camera, depth camera, etc.), which may be video cameras, still image cameras, etc., an eye scan or eye tracking sensor, a fingerprint or touch sensor, a microphone, etc. For example, the stream source(s) 110 may be internal or external to the device 100, and may be communicatively coupled to the computing device via substantially any wired or wireless interface (e.g., universal serial bus (USB), Firewire, local area network (LAN), wireless LAN (WLAN), Bluetooth, radio frequency identification (RFID), near field communication (NFC), etc.).

In an example, operating system 106 can provide a secure framework 112 having a secure memory 114 for storing one or more secured buffers 116, 118. For example, the secure framework 112 can store data in the secured buffers 116, 118 using an encryption algorithm and/or associated encryption keys that may be known by the secure framework 112 and not exposed outside of the secure framework 112. Accordingly, the secure framework 112, e.g., via one or more components 120, 122, 124, can manage storage and retrieval of data in the secured buffers 116, 118 based on requests from the components 120, 122, 124 in a secure environment (e.g., using the encryption algorithm to store data upon request and/or using a corresponding decryption algorithm to retrieve data upon request). In one example, the secure framework 112 may assign secured buffer identifiers to the secured buffers 116, 118 for indicating to the components 120, 122, 124 when storing the data, and for allowing the components 120, 122, 124 to specify the secured buffer identifiers when requesting corresponding data. For example, the secure framework 112 may generate one or more of the secured buffer identifiers as a globally unique identifier (GUID).

As described, the secure framework 112 may include one or more components to facilitate securely storing/retrieving data in the secure memory 114, including a secure driver component 120 for communicating with a driver 126 of the operating system 106, a secure stream server component 122 for communicating with a stream server 128 provided by the operating system 106, and/or a secure application component 124 for communicating with an application 108 executing on the device 100. For example, application 108 can execute within (e.g., as a service) or on top of the operating system 106. In an example, access to the secure framework 112 may require using such secure components 120, 122, 124, and there may be additional secure components in the secure framework 112 (e.g., for other drivers and/or services/applications executing on operating system 106). In addition, for example, secure framework 112 may provide the components 120, 122, 124 for exclusive use by the driver 126, stream server 128, and/or application 108, respectively. Moreover, in an example, secure framework 112 may facilitate establishing a trust relationship with the driver 126, stream server 128, application 108, etc. (e.g., by allowing specification of credentials, a unique identifier, and identifier encrypted using one or more keys known by the secure framework 112, etc.) and/or the related components 120, 122, 124.

In an example, driver 126 can execute on the operating system 106 for providing stream data from stream source 110 to the operating system 106 and/or one or more components thereof, such as stream server 128 for providing the stream data (e.g., as modified, aggregated/correlated with stream data from other devices, or otherwise) to one or more applications 108 or other services/components of the operating system 106. Driver 126 can include a secure mode component 130 for activating a secure mode at the driver 126, and a secured buffer storing component 132 for storing stream data from stream source 110 in a secured buffer 116, 118 via secure framework 112 when the secure mode is activated.

In addition, in an example, stream server 128 can execute via the operating system 106 (e.g., as a service) to obtain stream data from the stream source 110 (e.g., via the driver 126 and/or via the secure framework 112 receiving data from the driver 126). Stream server 128, in an example, may modify, aggregate, correlate, etc. data from one or more stream sources for providing to one or more applications. For example, stream server 128 can output data from multiple stream sources 110 in one or more output streams that include framed data output according to a cadence (e.g., video frames from a camera at a frames per second cadence). Stream server 128, for example, may also include a secure mode component 134 for activating a secure mode at the stream server 128, and a secured buffer identifier providing component 136 for obtaining and providing one or more secured buffer identifiers to driver 126, one or more applications 108, operating system 106, etc. for storing and/or retrieving stream data to/from one or more secured buffers 116, 118 via secure framework 112.

Additionally, application 108 may include an application 108 leveraging one or more functions of the operating system 106 for executing thereon and/or may be one or more services provided by operating system 106. In an example, application 108 may include a secure mode component 138 for activating a secure mode at the application 108, and a secured buffer accessing component 140 for accessing one or more secured buffers 116, 118 to obtain secured stream data. In one example, stream server 128 can operate in a non-secure mode. In the non-secure mode, stream server 128 can receive stream data from the driver 126, and store the stream data in a non-secure memory for accessing by application 108. In another example, as described further below, stream server 128 can activate a secure mode for secure handling of stream data from the driver 126. In the secure mode, stream server 128 can provide one or more secured buffer identifiers to the driver 126 and/or to the application 108. Driver 126, for example, can accordingly store stream data in one or more secured buffers 116, 118 based on the one or more secured buffer identifiers, and application 108 can access the stream data in the one or more secured buffers 116, 118 based on the one or more secured buffer identifiers. Storing and accessing data in the secure framework 112 via components 120, 124 in this regard can prevent playback or middleman attacks where stream data could otherwise be overridden or otherwise compromised in a non-secure framework.

FIG. 2 is a flowchart of an example of a method 200 for storing stream data in a secured buffer. For example, method 200 can be performed by a device 100 and/or one or more components thereof to facilitate securely storing the stream data.

In method 200, at action 202, a secure mode can be enabled for storing, in a secured buffer, stream data captured from a stream source. In an example, secure mode component 134, e.g., in conjunction with processor 102, memory 104, operating system 106, application 108, etc., can enable the secure mode (e.g., at stream server 128) for storing, in the secured buffer (e.g., secured buffer 116, 118), stream data captured from the stream source (e.g., stream source 110). In one example, application 108, via secure mode component 138, may request operation in a secure mode such that data from stream source 110 is stored in the secure framework, where the secure mode component 138 may provide the request to stream server 128 (e.g., via an interface). In an example, stream server 128 can activate the secure mode to facilitate storage and retrieval of stream data from stream source 110 via secure framework 112. In one example, secure mode component 134 may initialize the secure framework 112 (e.g., based on querying the operating system 106 to determine whether the secure framework 112 is available). In one example, secure mode component 134 can enable the secure mode for a period of time (which may be configured or otherwise specified in the request), until a request to exit the secure mode is received, etc.

As described, for example, stream server 128 may operate in a non-secure mode to receive and store stream data from the stream source 110 in non-secure memory, and can allow the application 108 to obtain the stream data from the non-secure memory. In one example, stream server 128 may operate in the secure mode and the non-secure mode for different applications. For example, stream server 128 may facilitate contemporaneous storage of the stream data from stream source 110 in separate non-secure and secure memory locations for non-secure and secure consumption by the different applications.

In method 200, at action 204, the secured buffer can be allocated in a secure memory based at least in part on enabling the secure mode. In an example, secure mode component 134, e.g., in conjunction with processor 102, memory 104, operating system 106, application 108, etc., can allocate, based at least in part on enabling the secure mode, the secured buffer (e.g., secured buffer 116, 118, etc.) in the secure memory (e.g., secure memory 114 of secure framework 112). In an example, secure mode component 134 can communicate with the secure framework 112 via secure stream server component 122 to allocate the secured buffer 116, 118. For example, secure mode component 134, e.g., based on activating the secure mode, can request allocation of one or more secured buffers 116, 118 from secure framework 112 via secure stream server component 122. In an example, secure framework 112 can accordingly allocate one or more secured buffers 116, 118 in secure memory 114 and can provide an indication of the allocation back to the stream server 128. In one example secure framework 112, e.g., via secure stream server component 122, can indicate one or more secured buffer identifiers corresponding to the allocated secured buffer(s) 116, 118 to stream server 128.

In this regard, in allocating the secured buffer at action 204, optionally at action 206, one or more secured buffer identifiers can be received from a secure framework. In an example, secure mode component 134, e.g., in conjunction with processor 102, memory 104, operating system 106, application 108, etc., can receive the one or more secured buffer identifiers (corresponding to the one or more allocated secured buffers 116, 118) from the secure framework 112 (e.g., or a component thereof, such as secure stream server component 122). For example, the secured buffer identifiers may correspond to a location in the secure memory 114 of secured buffers 116, 118. For example, the secured buffer identifiers may be identifiers that can be mapped (e.g., by a mapping table stored in the secure framework 112, such as in secure memory 114 as well) to locations in the secure memory 114 of the one or more secured buffers 116, 118. For example, the secured buffer identifiers may be generated as a GUID and associated to the locations in secure memory 114 by the secure framework 112. In another example, the secured buffer identifiers may include a value resulting from applying a hash function, encryption algorithm, etc. to a memory location of secured buffers 116, 118 in secure memory 114. In any case, the secured buffer identifiers can be generated by the secure framework 112 and associated with the secured buffers 116, 118 so one or more components 120, 122, 124 can specify the secured buffer identifiers to facilitate storing and/or retrieving stream data from the secured buffers 116, 118.

In method 200, at action 208, a secured buffer identifier of the secured buffer can be provided to a driver of a device proving the stream source for storing the stream data captured from the stream source in the secured buffer. In an example, secured buffer identifier providing component 136, e.g., in conjunction with processor 102, memory 104, operating system 106, application 108, etc., can provide the secured buffer identifier of the secured buffer (e.g., secured buffer 116, 118) to a driver (e.g., driver 126) of a device providing the stream source (e.g., stream source 110) for storing the stream data captured from the stream source in the secured buffer. In this example, providing the secured buffer identifier to the driver 126 can allow the driver 126 to request secure storage of stream data from the stream source 110 via secure driver component 120. For example, secured buffer identifier providing component 136 can provide the secured buffer identifiers to the driver 126 as part of enabling secure mode at the stream server 128 and/or at driver 126.

In method 200, optionally at action 210, a driver secure mode can be enabled at the driver based on enabling the secure mode. In an example, secure mode component 130, e.g., in conjunction with processor 102, memory 104, operating system 106, etc., can enable the driver secure mode at the driver 126 based on enabling the secure mode at the stream server 128. In one example, secure mode component 130 can receive a request from the stream server 128 to enable the driver secure mode. In one example, secure mode component 130 can enable the secure mode for a period of time (which may be configured or otherwise specified in the request), until a request to exit the secure mode is received, etc. As described, in one example, driver 126 can operate in a non-secure mode as well to store stream data from stream source 110 in non-secure memory while also storing the same or similar stream data from stream source 110 in secure memory 104 via secure driver component 120.

In method 200, optionally at action 212, the stream data can be stored, by the driver, in the secured buffer based on providing the secured buffer identifier to a secure framework component. In an example, secured buffer storing component 132, e.g., in conjunction with processor 102, memory 104, operating system 106, etc., can store, by the driver 126, the stream data in the secured buffer (e.g., secured buffer 116, 118) based on providing the secured buffer identifier to a secure framework component (e.g., secure driver component 120). For example, driver 126 can receive stream data from stream source 110 and, when secure mode is enabled, can store the stream data in one or more secured buffers 116, 118 by utilizing the secure driver component 120 in secure framework 112. For example, driver 126 can provide the data and/or at least one secured buffer identifier (e.g., as received from stream server 128) to the secure driver component 120 to store the data in the secured buffer 116, 118 corresponding to the secured buffer identifier. For example, secure driver component 120 can receive the data and the secured buffer identifier, determine a location in secure memory 114 corresponding to the secured buffer identifier (e.g., based on a mapping table, hash function, decryption function, etc., as described), and store the data at the secured buffer location corresponding to the secured buffer identifier. In one example, where a plurality of secured buffer identifiers are received from the stream server 128, secured buffer storing component 132 can select one of the secured buffer identifiers for storing the stream data in a corresponding secured buffer. In addition, in an example, secured buffer storing component 132 may notify stream server 128 when stream data has been stored in the secured buffer 116, 118 to allow stream server 128 to obtain the stream data and/or provide a notification to one or more other components (e.g., application 108) to obtain the stream data.

In method 200, at action 214, the secured buffer identifier of the secured buffer can be provided to the application for accessing the stream data in the secured buffer. In an example, secured buffer identifier providing component 136, e.g., in conjunction with processor 102, memory 104, operating system 106, etc., can provide the secured buffer identifier of the secured buffer (e.g., secured buffer 116, 118) to the application (e.g., application 108) for accessing the stream data in the secured buffer. In this example, providing the secured buffer identifier to the application 108 can allow the application 108 to request stream data from the secured buffer via secure application component 124. For example, secured buffer identifier providing component 136 can provide the secured buffer identifiers to the application 108 based at least in part on a request by application 108 to enable the secure mode. In another example, secured buffer identifier providing component 136 can provide the secured buffer identifiers to the application 108 when or as stream data is available in the one or more secured buffers 116, 118 corresponding to the one or more provided secured buffer identifiers (e.g., according to a cadence at which the stream source 110 sends data to the driver 126, and the driver 126 stores data in the secured buffers 116, 118).

In method 200, optionally at action 216, the stream data can be retrieved, by the application, from the secured buffer based on providing the secured buffer identifier to a secure framework component. In an example, secured buffer accessing component 138, e.g., in conjunction with processor 102, memory 104, etc., can retrieve, by the application 108, the stream data from the secured buffer (e.g., secured buffer 116, 118) based on providing the secured buffer identifier to a secure framework component (e.g., secure application component 124). For example, application 108 can utilize the secure application component 124 to access the secured buffer 116, 118 corresponding to the secured buffer identifier to obtain the stream data (e.g., by providing an indication of the secured buffer identifier to the secure application component 124). In this example, secure application component 124 can obtain the secured buffer identifier from the application 108, determine the location in secure memory 114 of the secured buffer 116, 118 based on the secured buffer identifier (e.g., based on a mapping table, applying a hash function or decryption function to the identifier, etc.), obtain the data from the secured buffer 116, 118 location, and provide the data contents to the application 108. In one example, where the stream data is retrieved, secure buffer accessing component 138 may notify the stream server 128 of the accessing, and secure mode component 134 may accordingly release the secured buffer 116, 118. In this regard, the secure framework 112 may recycle the used secured buffers in subsequent requests to allocate secured buffers from one or more stream servers 128 or other components of the operating system 106.

In one specific example, the stream source 110 may correspond to a camera, and the application 108 may request entry into a secure mode for face authentication. In this example, secure mode component 138 can request stream server to enter secure mode, and secure mode component 134 can activate the secure mode and allocate one or more secured buffers 116, 118 in secure framework 112 via secure stream server component 122. In this example, secured buffer identifier providing component 136 can provide one or more secured buffer identifiers corresponding to the one or more secured buffers 116, 118 to driver 126 and to application 108. Secure mode component 134, for example, may additionally activate a secure mode at the driver 126. Secure mode component 130 at the driver 126 can activate secure mode, and secured buffer storing component 132 can begin storing stream data in the secured buffer(s) 116, 118 by providing stream data and the buffer identifier(s) to secure driver component 120. In this example, secured buffer accessing component 140 can access the secured buffer(s) 116, 118 based on the secured buffer identifiers to obtain the secured stream data while in secure mode. In one example, driver 126 can notify stream server 128 when data is stored in the secured buffer(s) 116, 118 (e.g., by providing the secured buffer identifier at which the stream data is stored), secured buffer identifier providing component 136 can receive the stream buffer identifier from driver 126 and provide it to application 108, and secured buffer accessing component 140 can accordingly obtain the stream data based on the secured buffer identifier. Securing the stream data in this example can prevent tampering with the stream data during the face authentication process of the application 108. Once the face authentication process is complete, secure mode component 138 can request stream server 128 to exit the secure mode, secure mode component 134 can request the driver 126 exit secure mode, etc., and driver 126 can return to storing stream data in non-secure memory.

FIG. 3 is a flowchart of an example of a method 300 for storing stream data in a secured buffer and also storing the stream data in a non-secured buffer. For example, method 300 can be performed by a device 100 and/or one or more components thereof to facilitate securely storing the stream data and storing stream data in non-secure storage.

In method 300, at action 302, a secure mode a secure mode can be enabled for storing, in a secured buffer, stream data captured from a stream source, as described above with respect to action 202 in FIG. 2. Additionally, at action 304, the secured buffer can be allocated in a secure memory based at least in part on enabling the secure mode, as described above with respect to action 204 in FIG. 2. At action 306, a secured buffer identifier of the secured buffer can be provided to a driver of a device proving the stream source for storing the stream data captured from the stream source in the secured buffer, as described above with respect to action 208 in FIG. 2. At action 308, the stream data can be stored, by the driver, in the secured buffer based on providing the secured buffer identifier to a secure framework component, as described above with respect to action 212 in FIG. 2.

In addition, in method 300, optionally at action 310, a non-secured buffer can be allocated for the stream data based on a request from a second application. In an example, stream server 128, driver 126, etc., e.g., in conjunction with processor 102, memory 104, etc., can allocate the non-secured buffer for the stream data based on the request from the second application (not shown). For example, stream server 128, driver 126, etc. can allocate the non-secured buffer in memory 104 outside of the secure framework 112 to allow the second application to access stream data without using the secure framework 112.

Accordingly, in method 300, optionally at action 312, the stream data can be stored, by the driver, in the non-secured buffer for access by the second application. In an example, driver 126, e.g., in conjunction with processor 102, memory 104, etc., can store the stream data in the non-secured buffer for access by the second application. For example, driver 126 can thus store the same stream data both in the secured buffer and the non-secured buffer to allow secure and non-secure access to the data. For example, the second application may not need to ensure security of the stream data, and may thus not desire to incur any potential overhead, system resource requirements, etc. that may be needed for securing the stream data.

Figure 4:
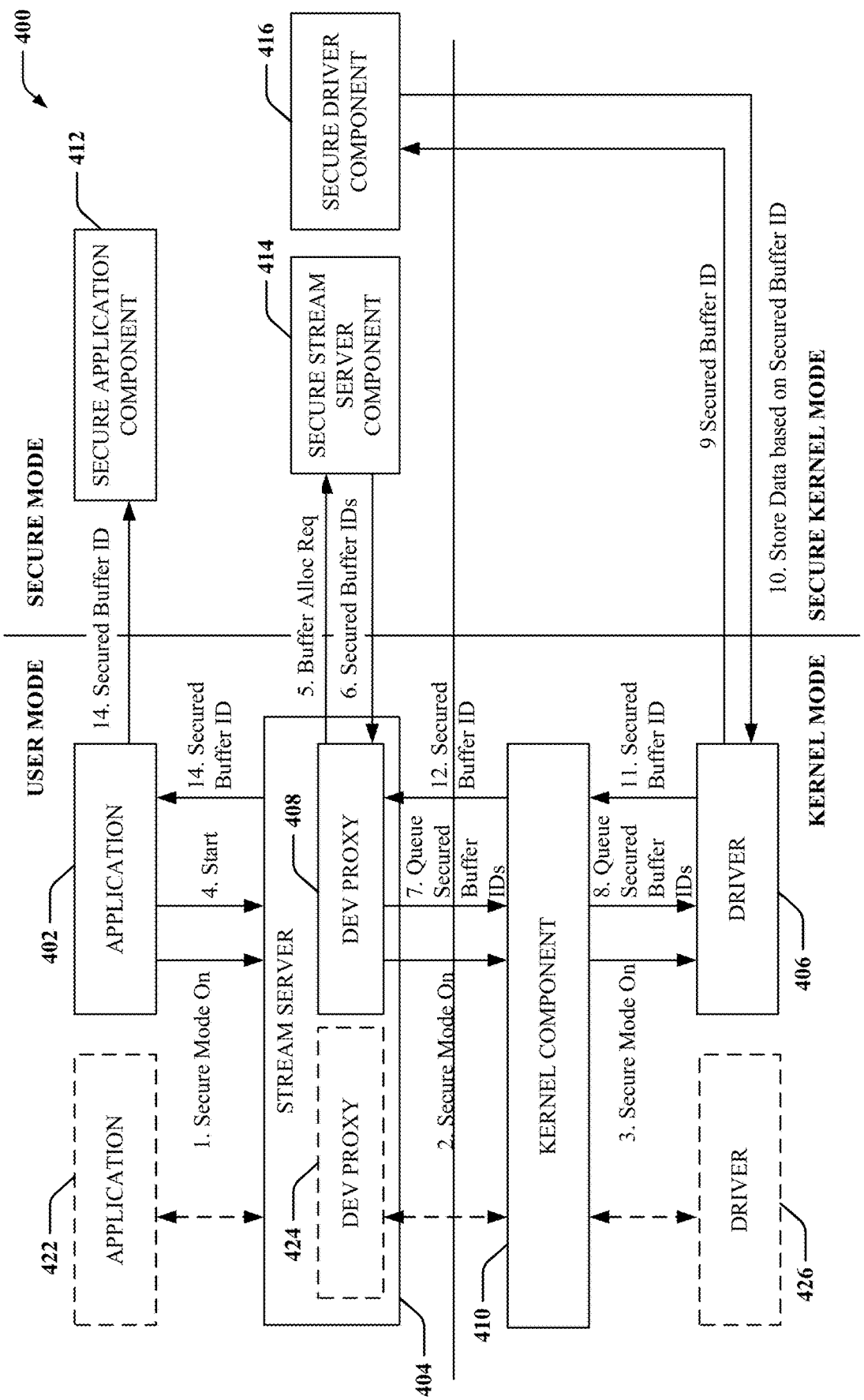
FIG. 4 is a schematic diagram of an example of a system for providing secure modes for securing stream data.

FIG. 4 illustrates an example of a system 400 (e.g., an operating system or at least a portion thereof) operating on a processor to secure stream buffers. System 400 includes an application 402, which can be similar to application 108, for requesting activation of a secure mode for securing stream data corresponding to one or more devices (e.g., a camera or other sensor device delivering framed data). System 400 also includes a stream server 404, which can be similar to stream server 128, for receiving stream data from one or more stream sources or corresponding drivers 406, and providing the stream data to, or otherwise facilitate accessing of the stream data by, application 402. Stream server 404 includes a device proxy 408 that interfaces with the driver 406 via a kernel component 410 of an operating system. Application 402, stream server 404, kernel component 410 and driver 406 may execute in a user mode, which may be a non-secure portion of system 400. System 400 can also have a secure mode portion including a collection of secure components, such as secure application component 412, which may be similar to secure application component 124, for allowing application 402 to communicate in the secure mode, secure stream server component 414, which may be similar to secure stream server component 122, for allowing stream server 404 to communicate in the secure mode, and secure driver component 416, which may be similar to secure driver component 120, for allowing driver 406 to communicate in the secure mode. In addition, system 400 may have a kernel mode within which driver 406 and kernel component 410 can operate, and a secure kernel mode via which driver 406 can communicate with secure driver component 416 to secure stream data.

In system 400, application 402 can activate secure mode by requesting activation to stream server 404 (e.g., at least for a given stream source or related device). Stream server, via device proxy 408, can request activation of secure mode to the kernel component 410, which can request activation of the secure mode to driver 406. With secure mode activated, application 402 can activate or request activation of the stream source from stream server 404. Stream server 404, via device proxy 408, can accordingly request buffer allocation to secure stream server component 414, which can allocate one or more secured buffers for storing stream data. Secure stream server component 414 can provide a collection of secured buffer identifiers to the device proxy 408. Device proxy 408 can queue the collection of secured buffer identifiers to the kernel component 410, which can queue the collection of secured buffer identifiers to the driver 406.

Based on activating the secure mode, driver 406 can store stream data in secure memory by providing one of the secured buffer identifiers to secure driver component 416 along with data to be stored in the secured buffer. Secure driver component 416 can store the data in the secured buffer, and can acknowledge storage of the data in the secured buffer corresponding to the secured buffer identifier back to the driver 406. Driver 406 can accordingly provide the secured buffer identifier at which the data is stored to the kernel component 410, which can provide the secured buffer identifier to the device proxy 408. Stream server 404 can accordingly provide the secured buffer identifier to the application 402, which can provide the secured buffer identifier to secure application component 412. Secure application component 412, operating in the secure mode, can access the secured buffer corresponding to the secured buffer identifier to retrieve the data stored by the driver 406. In an example, the communication of the secured buffer identifier from driver 406, to stream server 404, to application 402 can be an indication that data is available from and has been stored by the driver 406.

In addition, for example, system 400 may optionally include an application 422, which may also request stream data from a stream source corresponding to driver 406, but may request the stream data in a non-secure mode. In this example, application 422 can request the stream data via stream server 404. Device proxy 408 can accordingly request the stream data from driver 406 via kernel component 410. In this example, driver 406 can receive stream data, and store the stream data both in secure memory via secure driver component 416, as described above, and also in non-secure memory for consumption by application 422. For example, application 422 may be a video conferencing application that may not desire secured stream data as a face authentication application may. In any case, applications 402, 422 can obtain the stream data from different sources, and driver 406 can provide the same stream data to the different sources (e.g., secure and non-secure memory).

In another example, system 400 may include an additional driver 426 for obtaining stream data from an additional device. In this example, application 402 may also request data from the additional driver 426 via stream server 404 (e.g., in a secure or non-secure mode). Device proxy 424 can communicate with driver 426 via kernel component 410 to obtain the data, a memory location of the data, a secured buffer identifier corresponding to the data, etc., as described above with respect to device proxy 408. In any case, stream server 404 can expose multiple secure or non-secure data streams to one or more applications 402, 422, and/or can contemporaneously support secure and non-secure data streams for a given driver 406, 426.

Figure 5:
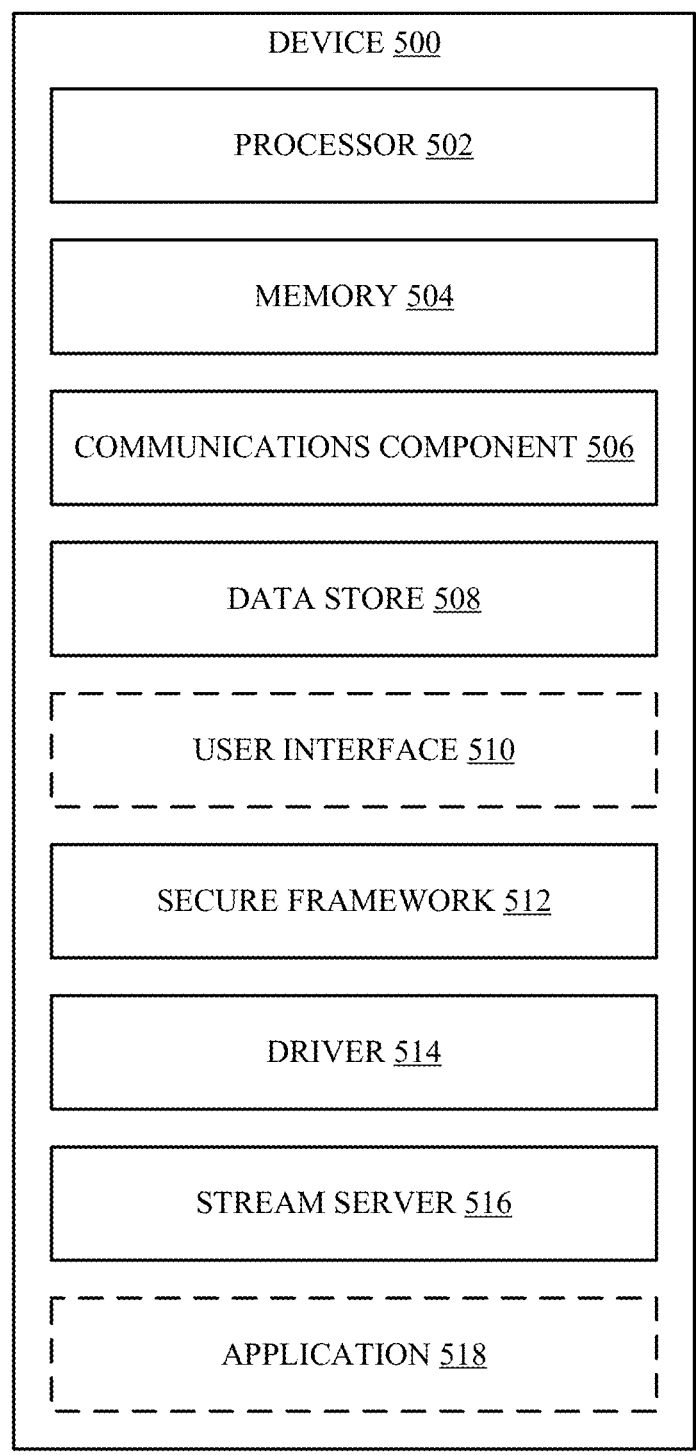
FIG. 5 is a schematic diagram of an example of a device for performing functions described herein.

FIG. 5 illustrates an example of device 500 including additional optional component details as those shown in FIG. 1. In one aspect, device 500 may include processor 502, which may be similar to processor 102 for carrying out processing functions associated with one or more of components and functions described herein. Processor 502 can include a single or multiple set of processors or multi-core processors. Moreover, processor 502 can be implemented as an integrated processing system and/or a distributed processing system.

Device 500 may further include memory 504, which may be similar to memory 104 such as for storing local versions of operating systems (or components thereof) and/or applications being executed by processor 502, such as secure framework 512, driver 514, stream server 516, application 518, etc., related instructions, parameters, etc. Memory 504 can include a type of memory usable by a computer, such as random access memory (RAM), read only memory (ROM), tapes, magnetic discs, optical discs, volatile memory, non-volatile memory, and any combination thereof.

Further, device 500 may include a communications component 506 that provides for establishing and maintaining communications with one or more other devices, parties, entities, etc. utilizing hardware, software, and services as described herein. Communications component 506 may carry communications between components on device 500, as well as between device 500 and external devices, such as devices located across a communications network and/or devices serially or locally connected to device 500. For example, communications component 506 may include one or more buses, and may further include transmit chain components and receive chain components associated with a wireless or wired transmitter and receiver, respectively, operable for interfacing with external devices.

Additionally, device 500 may include a data store 508, which can be any suitable combination of hardware and/or software, that provides for mass storage of information, databases, and programs employed in connection with aspects described herein. For example, data store 508 may be or may include a data repository for operating systems (or components thereof), applications, related parameters, etc.) not currently being executed by processor 502. In addition, data store 508 may be a data repository for secure framework 512, driver 514, stream server 516, application 518, and/or one or more other components of the device 500.

Device 500 may optionally include a user interface component 510 operable to receive inputs from a user of device 500 and further operable to generate outputs for presentation to the user. User interface component 510 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 510 may include one or more output devices, including but not limited to a display, a speaker, a haptic feedback mechanism, a printer, any other mechanism capable of presenting an output to a user, or any combination thereof.

Device 500 may additionally include a secure framework 512, which may be similar to secure framework 112, for providing a secure memory for storing and/or access data in a secure environment, a driver 514, which may be similar to driver 126, for receiving and storing stream data from one or more stream sources, a stream server 516, which may be similar to stream server 128, for obtaining, aggregating, correlating, etc. data from one or more drivers, and/or an application 518, which may be similar to application 108, for requesting secure storage of stream data as described herein.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for securing stream data received from a stream source, comprising:
   allocating, for the stream source, a secured buffer in a secure memory;
   providing a secured buffer identifier of the secured buffer to a driver of a device providing the stream source to allow the driver to store, in the secured buffer, stream data captured from the stream source of the device, wherein the driver executes in a kernel mode of an operating system, wherein the device is a camera; and
   accessing, in a user mode of the operating system and based on the secured buffer identifier, stream data stored in the secured buffer for the stream source.

2. The method of claim 1, further comprising enabling, based on a request from an application, a secure mode for storing the stream data captured from the stream source in the secured buffer, wherein providing the secured buffer identifier to the driver is based at least in part on enabling the secure mode.

3. The method of claim 2, further comprising:
   enabling a driver secure mode at the driver of the device based at least in part on enabling the secure mode; and
   causing the driver to store the stream data in the secured buffer based at least in part on providing, by the driver, the secured buffer identifier to a secure framework component, wherein the secure framework component has access to the secure memory in a secure kernel mode.

4. The method of claim 3, wherein the secure framework component stores the stream data in the secured buffer at a location corresponding to the secured buffer identifier.

5. The method of claim 2, further comprising:
   allocating a non-secured buffer for the stream data based on a request from a second application for non-secured use of the device;
   causing the driver to store the stream data in the secured buffer; and
   causing the driver to store the stream data in the non-secured buffer for access by the second application.

6. The method of claim 2, wherein the request from the application corresponds to performing authentication by the application.

7. The method of claim 1, wherein allocating the secured buffer comprises receiving a plurality of secured buffer identifiers from the secure framework component, and further comprising selecting the secured buffer identifier from the plurality of secured buffer identifiers.

8. The method of claim 1, further comprising:
   retrieving, in the user mode, the stream data from the secured buffer based at least in part on providing the secured buffer identifier to a secure framework component, wherein the secure framework component has access to the secure memory in a secure kernel mode.

9. A computing device for securing stream data received from a stream source, comprising:
   a memory storing one or more parameters or instructions for executing a stream server, wherein the stream server interfaces with the stream source; and
   at least one processor coupled to the memory, wherein the at least one processor is configured to:
     allocate, for the stream source, a secured buffer in a secure memory;
     provide a secured buffer identifier of the secured buffer to a driver of a device providing the stream source to allow the driver to store, in the secured buffer, the stream data captured from the stream source of the device, wherein the driver executes in a kernel mode of an operating system, wherein the device is a camera; and
     access, in a user mode of the operating system and based on the secured buffer identifier, stream data stored in the secured buffer for the stream source.

10. The computing device of claim 9, wherein the at least one processor is further configured to enable, based on a request from an application, a secure mode for storing the stream data captured from the stream source in the secured buffer, wherein the at least one processor is configured to provide the secured buffer identifier to the driver based at least in part on enabling the secure mode.

11. The computing device of claim 10, wherein the at least one processor is further configured to:
   enable a driver secure mode at the driver of the device based at least in part on enabling the secure mode; and
   cause the driver to store the stream data in the secured buffer based at least in part on providing, by the driver, the secured buffer identifier to a secure framework component, wherein the secure framework component has access to the secure memory in a secure kernel mode.

12. The computing device of claim 11, wherein the secure framework component stores the stream data in the secured buffer at a location corresponding to the secured buffer identifier.

13. The computing device of claim 10, wherein the at least one processor is further configured to:
   allocate a non-secured buffer for the stream data based on a request from a second application for non-secured use of the device;
   cause the driver to store the stream data in the secured buffer; and
   cause the driver to store the stream data in the non-secured buffer for access by the second application.

14. The computing device of claim 10, wherein the request from the application corresponds to performing authentication by the application.

15. The computing device of claim 9, wherein the at least one processor is configured to allocate the secured buffer based at least in part on receiving a plurality of secured buffer identifiers from the secure framework component, and selecting the secured buffer identifier from the plurality of secured buffer identifiers.

16. The computing device of claim 9, wherein the at least one processor is further configured to:
   retrieve, in the user mode, the stream data from the secured buffer based at least in part on providing the secured buffer identifier to a secure framework component, wherein the secure framework component has access to the secure memory in a secure kernel mode.

17. A non-transitory computer-readable medium, comprising code executable by one or more processors for securing stream data received from a stream source, the code comprising code for:
   allocating, for the stream source, a secured buffer in a secure memory;
   providing a secured buffer identifier of the secured buffer to a driver of a device providing the stream source to allow the driver to store, in the secured buffer, the stream data captured from the stream source of the device, wherein the driver executes in a kernel mode of an operating system, wherein the device is a camera; and
   accessing, in a user mode of the operating system and based on the secured buffer identifier, stream data stored in the secured buffer for the stream source.

18. The non-transitory computer-readable medium of claim 17, further comprising code for enabling, based on a request from an application, a secure mode for storing the stream data captured from the stream source in the secured buffer, wherein the code for providing provides the secured buffer identifier to the driver based at least in part on enabling the secure mode.

19. The non-transitory computer-readable medium of claim 17, further comprising code for:
   enabling a driver secure mode at the driver of the device based at least in part on enabling the secure mode; and
   causing the driver to store the stream data in the secured buffer based at least in part on providing, by the driver, the secured buffer identifier to a secure framework component, wherein the secure framework component has access to the secure memory in a secure kernel mode.

20. The non-transitory computer-readable medium of claim 17, further comprising code for:
   allocating a non-secured buffer for the stream data based on a request from a second application for non-secured use of the device;
   causing the driver to store the stream data in the secured buffer; and
   causing the driver to store the stream data in the non-secured buffer for access by the second application.

* * * * *